United States Patent
Bohamed

(10) Patent No.: US 9,890,026 B1
(45) Date of Patent: Feb. 13, 2018

(54) PORTABLE HYDRATION AND BOTTLE FILLING STATION

(71) Applicant: Gary Bohamed, Valencia, CA (US)

(72) Inventor: Gary Bohamed, Valencia, CA (US)

(73) Assignee: EMBO, LLC, Valencia, CA (US)

( * ) Notice: Subject to any disclaimer, the term of this patent is extended or adjusted under 35 U.S.C. 154(b) by 0 days.

(21) Appl. No.: 15/437,224

(22) Filed: Feb. 20, 2017

Related U.S. Application Data

(60) Provisional application No. 62/393,456, filed on Sep. 12, 2016.

(51) Int. Cl.
| | | |
|---|---|---|
| B67D 1/00 | (2006.01) | |
| B62B 3/00 | (2006.01) | |
| B67D 1/08 | (2006.01) | |
| B67D 7/84 | (2010.01) | |
| B67D 1/10 | (2006.01) | |
| B67D 7/02 | (2010.01) | |

(52) U.S. Cl.
CPC ............ B67D 1/0004 (2013.01); B62B 3/005 (2013.01); B67D 1/0082 (2013.01); B67D 1/0805 (2013.01); B67D 1/0894 (2013.01); B67D 1/10 (2013.01); B67D 7/0294 (2013.01); B67D 7/845 (2013.01); *B67D 2210/00139* (2013.01)

(58) Field of Classification Search
CPC .......... B67D 7/845; B67D 2210/00133; B67D 2210/00136; B67D 2210/00139; B60P 3/0257; B60P 3/2245; B60P 3/224; Y10T 137/4874
See application file for complete search history.

(56) References Cited

U.S. PATENT DOCUMENTS

| | | | | |
|---|---|---|---|---|
| 4,359,073 A | * | 11/1982 | de Stoutz | B67D 1/0004 134/55 |
| 5,154,317 A | * | 10/1992 | Roppolo, III | B05B 9/007 222/331 |
| 5,921,445 A | * | 7/1999 | Schmitz | B67D 1/0004 222/173 |
| 6,047,898 A | * | 4/2000 | Cox | B67D 1/0004 239/146 |
| 8,082,956 B2 | * | 12/2011 | Windmiller | B65D 1/06 141/113 |
| 2011/0048572 A1 | * | 3/2011 | Batson | B64F 1/28 141/1 |
| 2011/0197988 A1 | * | 8/2011 | Van Vliet | B67D 7/04 141/1 |

OTHER PUBLICATIONS

Waterboy Sports website, downloaded from Internet Jan. 19, 2017, 2 pages.

\* cited by examiner

*Primary Examiner* — Timothy L Maust
*Assistant Examiner* — Timothy P Kelly
(74) *Attorney, Agent, or Firm* — Jason T. Daniel, Esq.; Daniel Law Offices, P.A.

(57) ABSTRACT

A portable hydration and bottle filling station includes a cart having a frame, a plurality of wheels and a shelf on which a liquid storage tank is positioned. A pump unit is connected to the tank and supplies fluid to a plurality of manifolds located along the top end of the cart. At least one of the manifolds includes a plurality of spigots, each having a valve and an elongated spout. A plurality of water bottles are provided, each having a one way valve for engaging the elongated spout. Another of the manifolds includes a plurality of drinking lines having a valve and nozzle along a distal end.

15 Claims, 5 Drawing Sheets

PORTABLE HYDRATION AND BOTTLE FILLING STATION

CROSS-REFERENCE TO RELATED APPLICATIONS

This application claims the benefit of U.S. Application Ser. No. 62/393,456 filed on Sep. 12, 2016, the contents of which are incorporated herein by reference.

TECHNICAL FIELD

The present invention relates to a portable hydration station for quickly and hygienically filling water bottles.

BACKGROUND

The statements in this section merely provide background information related to the present disclosure and may not constitute prior art.

It is common for participants of organized sporting events to be provided with water or other beverages for hydration during the contest. Whether the event is at the high school, college, or professional level, each team typically has one or more assistants who are responsible for providing beverages to the athletes.

Owing to the minimal facilities that are often available during outdoor events, the most common means for providing the beverages is through the use of refillable water bottles that are shared by everyone. In this regard, the bottles are typically filled by removing the cap and filling the topless bottle with a hose, igloo cooler/dispenser, or by physically dunking the bottle into a central cooler that contains a beverage. During this process, contaminants such as dirt, grass and other forms of debris located along the outside of the bottles and/or the assistants' hands are transferred into the beverage and ultimately consumed by the players. Aside from exposing the players to illness, this cumbersome process typically causes a significant portion of the beverage within the water bottle to become spilled before the assistant can replace the cap. As such, it is not uncommon for athletes to be handed a water bottle that is dirty and empty.

Although there are many known systems for providing beverages to players that do not utilize water bottles, such systems can only be used when the player is not on the field. As such, the need for portable water bottles that can be quickly and easily used by players on the field (during timeouts, for example) remains, and is not likely to change in the foreseeable future.

Accordingly, it would be beneficial to provide a portable station that can quickly and easily fill multiple water bottles or other such devices in a sanitary manner that does not suffer from the drawbacks described above. It would also be beneficial if the portable station could simultaneously supply beverages to a plurality of users without the use of portable water bottles.

SUMMARY OF THE INVENTION

The present invention is directed to a portable hydration and bottle filling station. One embodiment of the present invention can include a cart having a frame, a plurality of wheels and a shelf on which a liquid storage tank is positioned. A pump unit is positioned along the tank and cart, and functions to supply liquid stored within the tank to a plurality of manifolds located along the top end of the cart.

Another embodiment of the present invention can include a plurality of spigots that are positioned along one or more of the manifolds. Each of the spigots including a valve and elongated spout that can dispense water into a portable water bottle. The system can also include a plurality of water bottles each having a one way valve for engaging the elongated spout.

Another embodiment of the present invention can include a plurality of drinking lines that are positioned along one or more of the manifolds. Each of the drinking lines including a valve and nozzle along a distal end thereof.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
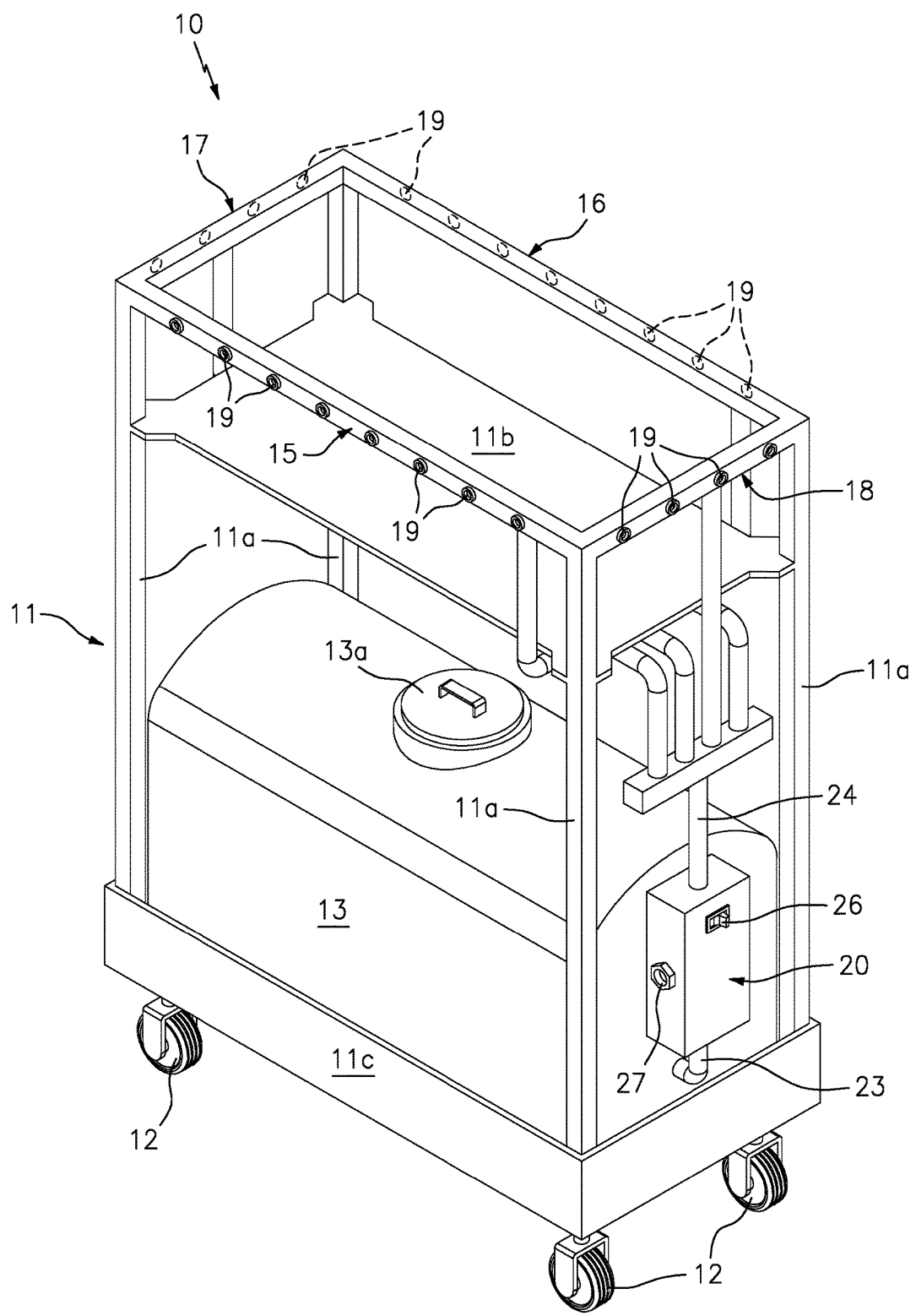
FIG. 1 is a perspective view of the portable hydration and bottle filling station that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The present description entails a portable hydration and water bottle filling station. As described herein, the term "sanitary" refers to the functionality of the station that eliminates the need for a user to physically remove the bottle top or submerge a water bottle within the internal portion of a storage tank, thereby contaminating the water with any residue located on the bottle body.

As described herein, the term "removably secured" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnetic elements, and/or compression fittings such as clamps, tethers (e.g., zip ties), snaps and buttons, for example. This can also be accomplished through the use of any number of commercially available couplers such as threaded plumbing fittings (e.g., male and female couplers) and/or NPT fittings, for example.

Moreover, the term "permanently secured" shall be used to describe a situation wherein two or more objects are joined together in a manner so as to prevent the same objects from being separated. Several nonlimiting examples include various adhesives such as glue or resin, hardware such as nuts and bolts, and welds, for example.

FIGS. 1-4 illustrate one embodiment of a portable hydration and bottle filling station 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in FIG. 1, the portable station 10 can include a cart 11 having a storage tank 13, a plurality of manifolds 15-18, and a pumping unit 20.

In the preferred embodiment, the cart 11 can include a plurality of rigid legs 11a that are interposed between an upper storage shelf 11b and a bottom shelf 11c having a plurality of wheels 12 secured thereon. In various embodiments, a hinged tow bar 14 (See FIG. 4) can be secured along one end of the cart to facilitate movement of the same. In either instance, the cart 11 can be constructed from any number of durable materials such as plastic or steel, for example, and can include any number of different shapes and sizes, depending on the size of the storage tank to be used. As such, the cart is not limited to the illustrated shape or structure.

The liquid storage tank 13 can include a hollow watertight main body having a removable cap/lid section 13a for receiving beverages to be stored therein. In the illustrated embodiment, the storage tank comprises a fifty-five gallon water tank; however, other embodiments are contemplated wherein the storage tank includes any number of different shapes and sizes to accommodate any number of different users. In the preferred embodiment, the tank can be constructed from two shells of plastic having insulative foam secured there between, however other construction materials are also contemplated.

In one embodiment, the portable station 10 can include four manifolds 15, 16, 17 and 18 that are each in fluid communication with one or more branches of the water outlet line 24 of the below described pumping unit. As shown, each of the manifolds can include a plurality of couplers 19 for engaging one or both of the below described spigots 30 and drinking lines 40, in order to supply liquids thereto. In the preferred embodiment, manifolds 15 and 16, located on the major axis of the portable cart can include six couplers, whereas manifolds 17 and 18 located on the minor axis of the portable cart can include four couplers. Of course, other embodiments are contemplated wherein any number of couplers are provided.

The pumping unit 20 can include a main body 21 which can be secured along the cart 11 and/or the storage tank 13.

Figure 2:
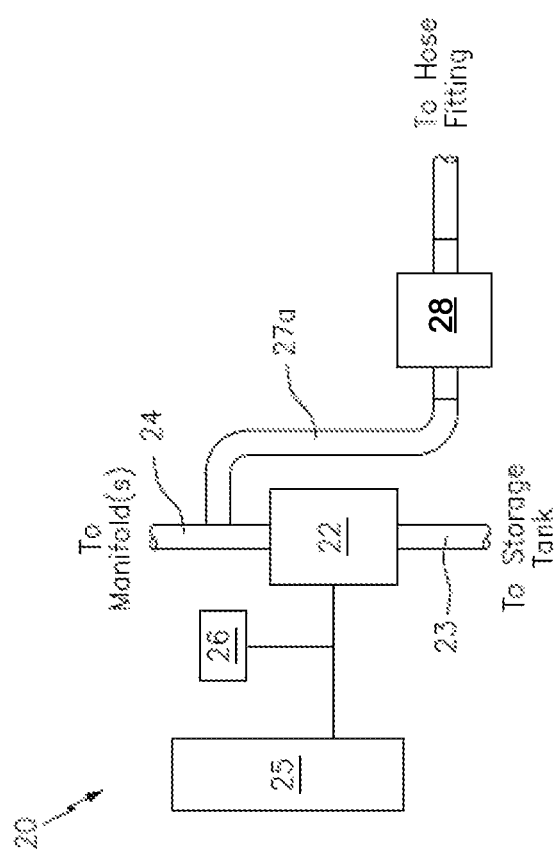
FIG. 2 schematically shows the pumping unit of the portable hydration and bottle filling station, in accordance with one embodiment of the invention.

As shown schematically in FIG. 2, one embodiment of the pumping unit can include an electric water pump 22 that is interposed between a water inlet line 23 that is connected to the storage tank and a water outlet line 24 that is connected to the manifold(s). The pump can be electrically connected to one or more batteries 25, and operation of the pump can be controlled by an electrical switch 26. In various embodiments, the pumping unit 20 can also include components for receiving water from a municipal water source. In such an embodiment, the pumping unit 20 can include a threaded hose fitting 27 that is positioned along the main body 21, and an optional water filter 28 located within the main body. In such and embodiment, the hose fitting can be connected 27a to the water outlet line 24 so as to bypass the pump and tank during operation.

Although described and illustrated with regard to particular components and/or particular arrangements of components, this is for illustrative purposes only, as any number of other components and arrangements thereof capable of performing the pumping unit functionality are also contemplated. To this end, operation of the pumping unit 20 will cause fluid to be distributed to the manifold(s) for use as described below.

Figure 3A:
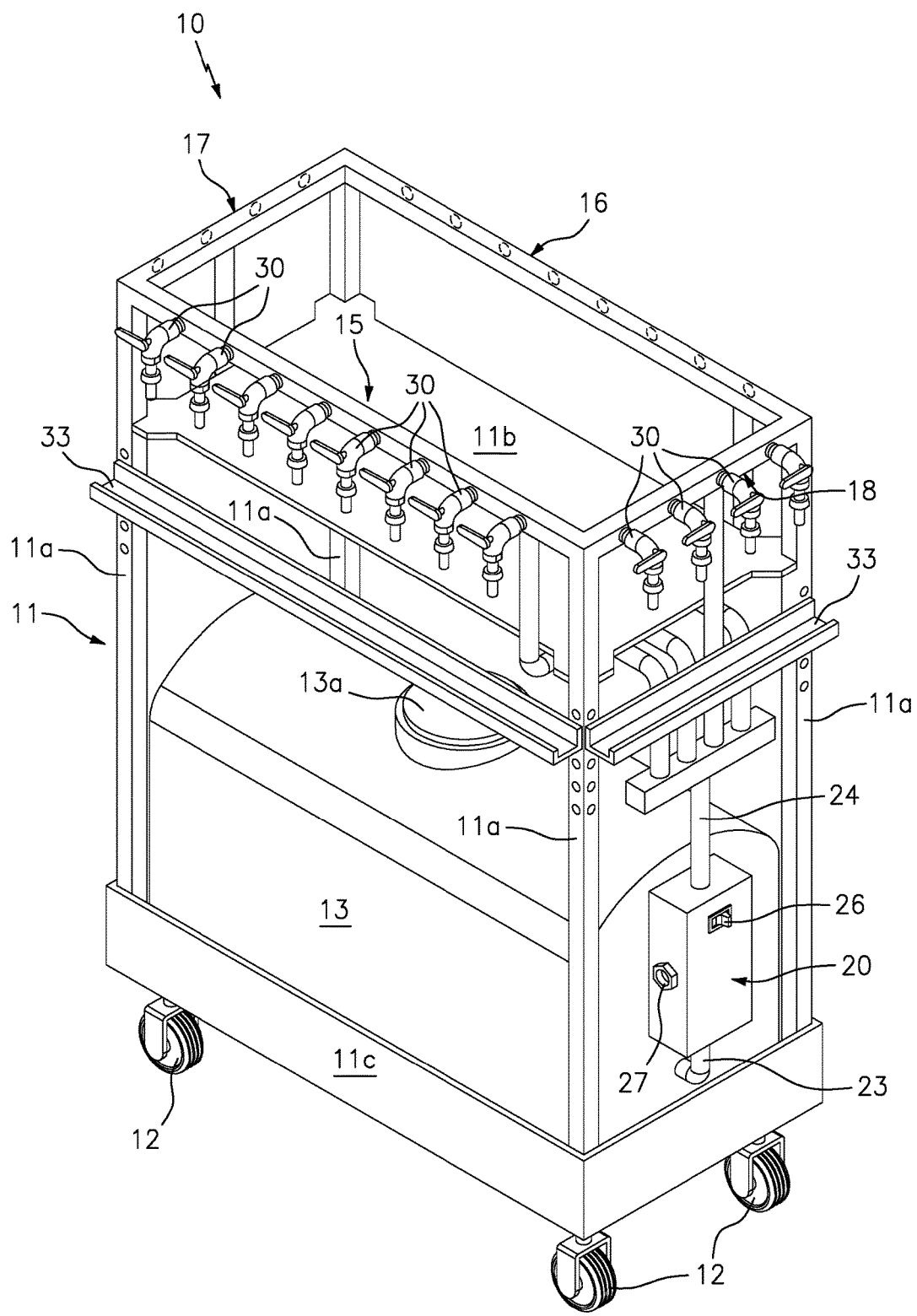
FIG. 3A is a perspective view of the portable hydration and bottle filling station, in accordance with one embodiment of the invention.
Figure 3B:
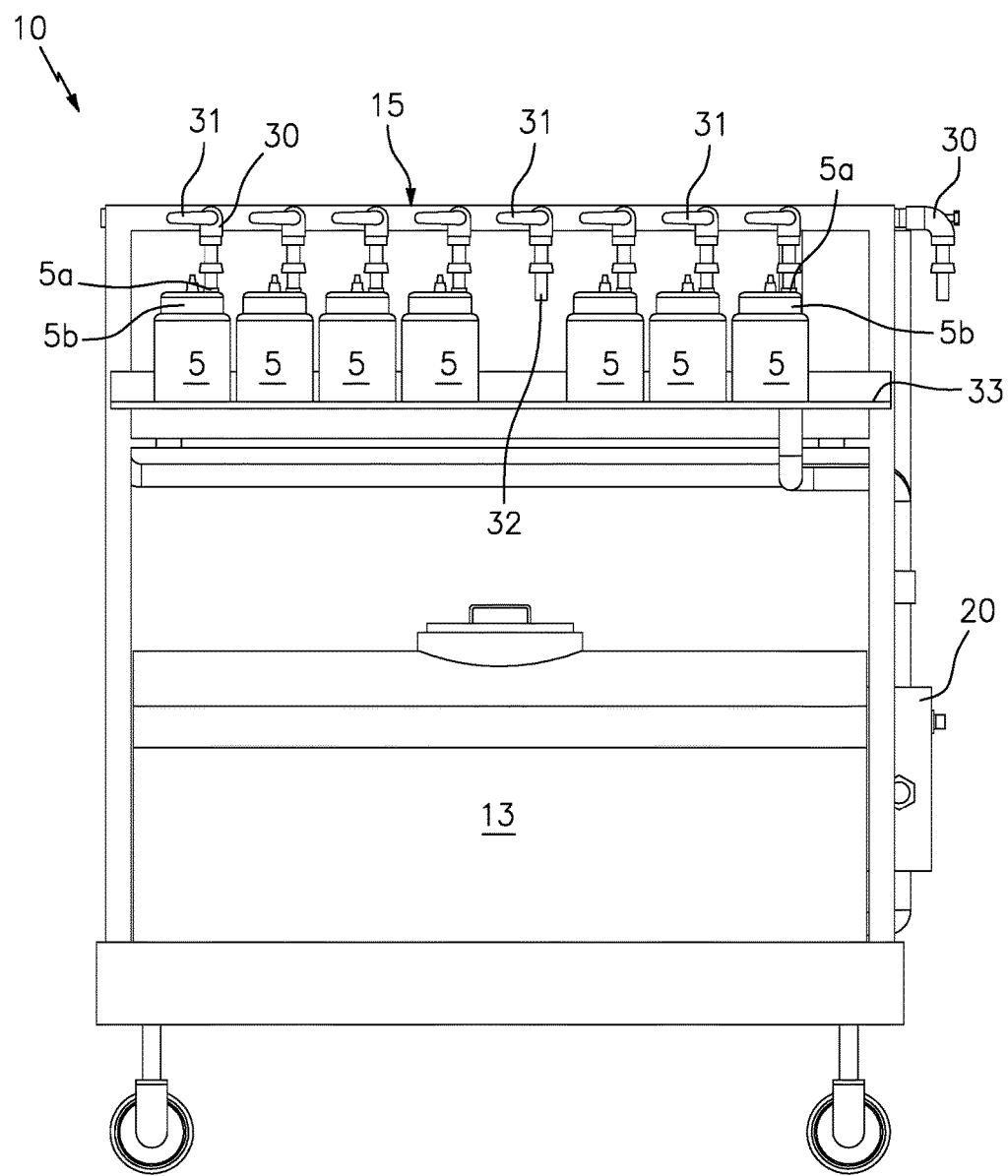
FIG. 3B is a side view of the portable hydration and bottle filling station in operation, in accordance with one embodiment of the invention.

As noted above, the portable station can be configured for different uses, based on the type of attachments that are secured onto the manifolds. For example, FIGS. 3A and 3B, illustrate one embodiment wherein a plurality of spigots 30 are coupled to the manifolds 15-18 in either a permanent or removable manner, so as to receive and dispense liquids into a portable water bottle. As shown, each spigot can include an internal valve having a valve handle 31 and a spout 32, for allowing a user to individually control the flow of liquid into a water bottle 5.

In the present embodiment, one or more bottle filling shelves 33 are provided so as to position any number of water bottles beneath the manifolds. In the preferred embodiment, each of the shelves 33 can be removably secured to the cart legs 11a, so as to be adjustable in nature. Such a feature allowing a user to adjust the height of each shelf 33 to suit the height of the water bottle being filled. Of course, other embodiments are contemplated wherein the shelves 33 are permanently secured to the cart.

In the preferred embodiment, the system can include a plurality of water bottles 5 having a one-way valve 5a positioned thereon. Each of the bottle valves 5a having a shape and size that is complementary to the shape and size of the distal end of the spout 32. In this regard, the distal end of each spigot spout can be inserted within a bottle valve 5a to allow the system to fill each bottle without requiring the bottle lid 5b to be opened. Of course, the system is not limited to the use of such bottles, as the system can function to fill any type of vessel having an opening for receiving liquids.

Figure 4:
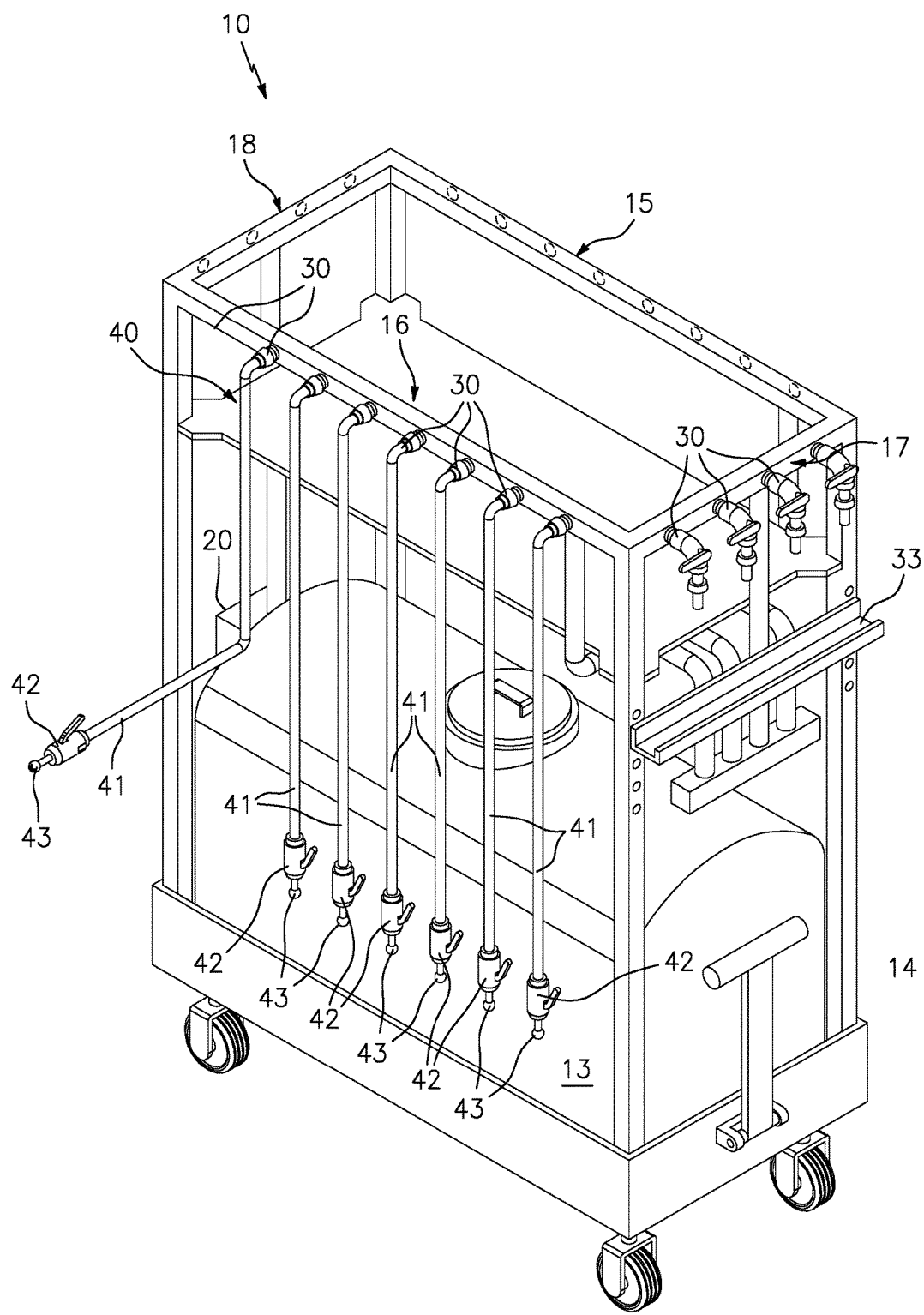
FIG. 4 is another perspective view of the portable hydration and bottle filling station, in accordance with one embodiment of the invention.

As shown in FIG. 4, the portable station 10 can also be configured for multipurpose use wherein a plurality of drinking lines 40 are coupled to or more of the manifolds 15-18 in either a permanent or removable manner. Each of the drinking lines can function to independently receive liquids from the manifold to which they are secured, and dispense the same directly to a user for consumption on demand.

In the preferred embodiment, each of the drinking lines can include an elongated flexible tube 41 having a flow restrictor 44 coupled to the opening of a manifold along one end, and a valve 42 and drinking nozzle 43 along the opposite end. In this regard, the flow restrictor can function to lower the pressure/flow of the liquids entering and exiting each drinking line, so as to allow the portable station to simultaneously dispense liquids from the spigots 30 at a higher flow rate than each of the drinking nozzles 44.

For example, in one embodiment, the output of the spigots can be between approximately 2-5 gallons per minute, whereas the output of the drinking lines can be between approximately 0.5 and 1 gallon per minute. Such a feature being advantageous for allowing users to quickly fill water bottles, while also conserving water that is used by the individual drinking lines. Of course, any number of other flow rates are also contemplated.

Accordingly, the above described portable station 10 provides hydration on-demand to anyone, while simultaneously filling any number of water bottles in a secure and sanitary manner.

As described herein, one or more elements of the portable station 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A portable hydration and bottle filling station, comprising:
    a cart having a frame and a plurality of wheels;
    a liquid storage tank that is positioned along the cart frame;
    a plurality of manifolds that are secured onto an upper portion of the cart in a first orientation;
    a plurality of water spigots that are coupled to at least one of the manifolds, each of the water spigots comprising a valve handle and a fixed spout that is oriented downward from the manifold, said fixed spout including a shape and size that is configured to engage a one way valve of a water bottle and to dispense a liquid therein;
    at least one drinking line that is coupled to at least one of the manifolds, each of the at least one drinking lines comprising an elongated flexible tube having a valve and drinking nozzle along a distal end;
    a plurality of water filling shelves that are positioned in the first orientation along the cart at locations directly beneath each of plurality of water spigots, said shelves including a shape and size that is configured to support a plurality of water bottles that are engaged with the plurality of water spigots; and
    a pumping unit having a water inlet line that is in communication with the liquid storage tank, and a water outlet line that is in communication with each of the one or more manifolds, said pumping unit functioning to pump a liquid stored within the liquid storage tank to each of the one or more manifolds.

2. The station of claim 1, wherein the pumping unit further comprises:
    an electric water pump that is interposed between the water input line and the water outlet line;
    one or more batteries that are electrically connected to the electric water pump; and
    a control switch for controlling an operation of the electric water pump.

3. The station of claim 1, further comprising:
    a plurality of water bottles, each comprising a one way valve having a shape and size that is configured to receive the elongated spout of one of the plurality of spigots.

4. The station of claim 1, wherein the plurality of water filling shelves are adjustably secured to the cart.

5. The station of claim 1, wherein the liquid storage tank is insulated and includes a removable cap for accessing an interior portion thereof.

6. The station of claim 1, wherein the cart further includes an upper storage shelf and a bottom shelf onto which the liquid storage tank is positioned.

7. The station of claim 1, further comprising:
    a tow bar that is hingedly secured onto the cart frame.

8. The station of claim 1, further comprising:
    a plurality of couplers that are secured onto each of the plurality of manifolds, each of said couplers being configured to receive one of the plurality of water spigots or one of the at least one drinking lines.

9. The station of claim 8, wherein each of the plurality of water spigots and the at least one manifold are removably secured to the plurality of manifolds via the plurality of couplers.

10. The station of claim 1, wherein the plurality of water spigots are configured to dispense the liquid at a first pressure, and each of the at least one drinking lines are configured to dispense the liquid at a second pressure.

11. The station of claim 2, further comprising:
a connector that is in fluid communication with the water outlet line, said connector being configured to receive water from a water supply source,
wherein the received water is distributed by the water outlet line directly to the one or more manifolds without engaging the electric water pump and liquid storage tank.

12. The station of claim 11, further comprising:
a water filter that is in communication with the water outlet line.

13. A portable hydration and bottle filling station, comprising:
a cart having a frame;
a liquid storage tank that is positioned along the cart frame;
one or more manifolds that are secured onto the cart in a first orientation, each of the one or more manifolds including a plurality of openings having couplers disposed thereon;
a plurality of water spigots that are removably coupled to at least one of the one or more manifolds, each of the water spigots comprising a valve handle and a fixed spout that is oriented downward from the manifold,
said fixed spout including a shape and size that is configured to engage a one way valve of a water bottle and to dispense a liquid therein;
at least one drinking line that is removably coupled to at least one of the one or more manifolds, each of the drinking lines comprising an elongated flexible tube having a valve and drinking nozzle along a distal end;
at least one water filling shelf that is adjustably connected to the cart at a location directly beneath each of plurality of water spigots, each of the at least one water filling shelf including a shape and size that is configured to support a plurality of water bottles that are engaged with the plurality of water spigots; and
a pumping unit having a water inlet line that is in communication with the liquid storage tank, and a water outlet line that is in communication with each of the plurality of manifolds, said pumping unit functioning to pump a liquid stored within the liquid storage tank to each of the manifolds,
wherein each of said couplers are configured to receive one of the plurality of water spigots or one of the at least one drinking lines.

14. The station of claim 13, further comprising:
a plurality of water bottles, each comprising a one way valve having a shape and size that is configured to receive the elongated spout of one of the plurality of spigots.

15. The station of claim 13, wherein the plurality of water spigots are configured to dispense the liquid at a first pressure, and each of the at least one drinking lines are configured to dispense the liquid at a second pressure.

\* \* \* \* \*